June 10, 1952 — T. BENNETT — 2,600,194
BEE BROODER
Filed Aug. 30, 1949
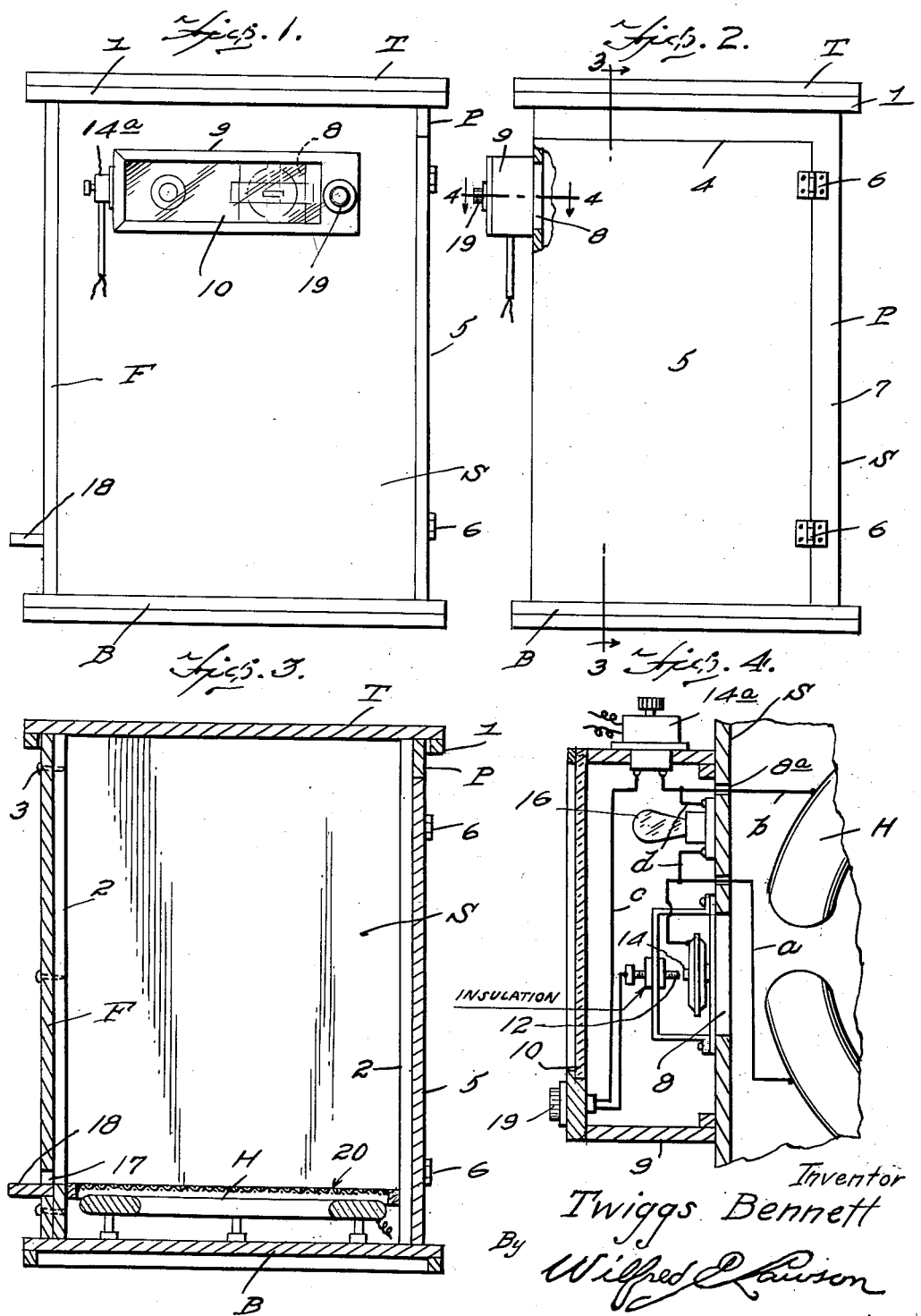
Inventor
Twiggs Bennett
By Wilfred E. Lawson
Attorney Patented June 10, 1952

2,600,194

UNITED STATES PATENT OFFICE 2,600,194

BEE BROODER

Twiggs Bennett, Amite, La.

Application August 30, 1949, Serial No. 113,218

1 Claim. (Cl. 6—1)

This invention relates to a honey bee brooder and it is an object of the invention to provide a brooder which allows the placing therein of one or more whole hives.

It is also an object of the invention to provide a brooder of this kind to receive the whole hive or hives and wherein automatically controlled heating means are provided for maintaining, when desired, the temperature at a static level both within and surrounding the hive to stimulate the queen as well as the brood to obtain faster development of the hive, or nuclear.

The invention also has for an object to provide a brooder which will hasten the production of worker bees as well as the volume of the bees produced by a single hive, and more especially for the quick production of queen bees, or nuclear.

The invention consists in the details of construction and in the combination and arrangement of the several parts of my improved honey bee brooder, whereby certain advantages are attained, as will be hereinafter more fully set forth.

In order that my invention may be better understood, I will now proceed to describe the same with reference to the accompanying drawings, wherein:

Figure 1 is a view in side elevation of a honey bee brooder constructed in accordance with an embodiment of the invention.

Figure 2 is a view of back in elevation;

Figure 3 is a sectional view taken substantially on the line 3—3 of Figure 2, looking in the directions of the arrows; and Figure 4 is an enlarged sectional view taken substantially on the line 4—4 of Figure 2, with parts in plan.

In the embodiment of the invention as illustrated in the accompanying drawings, the honey bee brooder comprises a housing including a bottom panel B, a top panel T, a front panel F, a back panel P and side panels S.

The bottom panel B and the top panel T are substantially of the same construction. Each of these panels is herein disclosed as rectangular in plan within the marginal portions defined by the depending flanges 1.

The front and back panels F and P slightly inward of their side or edges are provided on the inner faces with the cleats 2 which are abutted by the side marginal portions of the side panels S which fit snugly between the panels F and P. The panels S are held in place by the headed members 3, disposed through the panels S and penetrating the cleats 2.

The rear panel P has its major portion 4 cut out to provide an entrance to allow a honey bee hive to be readily placed within or removed from the housing. This entrance extends from the bottom of the panel P to a point closely adjacent the top end thereof and also extends from a point closely adjacent to one side of the panel P entirely across to the opposite side.

The entrance opening 4 is closed by an imperforated door 5 which when in closed position, tightly enages within the opening 5 with a side marginal portion overlapping and contacting the adjacent vertical edge of the side panel S at the open side of the opening 4. The opposite marginal portion of the door 5 is hingedly connected, at 6, to the adjacent relatively narrow portion 7 of the panel P. The door 5 swings outwardly when moving into open position and the closing movement of the door is limited by contact of the door with the free vertical edge portion of the side panel S, of the opening 4.

One of the side panels S in its upper part is provided with the openings 8 and 8a. Exteriorly of the side wall S and disposed over the openings 8, 8a is a box 9, the inner face of which being open to assure communication between the interior of the housing and the interior of the box 9 through the said openings 8. The outer wall 10 of the box 9 is preferably glass or transparent to allow visual access therein. This wall or panel 10 is readily slidable into or out of position to permit access within the box 9 as desired and particularly to adjust the regulating contact 12 comprised in the circuit maker or breaker. Coacting with the contact 12 is a thermostatic contact 14 herein disclosed of a wafer type.

Resting on the bottom panel B is an electric heater H of any desired type, a sub floor of copper screen just above heater or hive bottom so that a hive or hives placed within its brooder may be conveniently placed thereon.

The heater H has in communication therewith the conductors a and b. The conductor a passes out through the opening 8 and is in electric connection with the thermostatic contact 14. The contact b passes out through the opening 8a and is electrically connected with one of the contacts of a conventional switch 14a mounted on a wall of the box 9 and arranged exteriorly thereof. The second contact of the switch 14a is electrically connected by the conductor c with the contact 12. The contact 12 as herein set forth, comprises a headed member threading through a bracket within the box 9 but mounted on the adjacent panel S of the brooder.

Connected in parallel with the conductors a and b by the conductors d is a tell tale light 16 positioned within the box 9 but mounted on the panel S.

The lower portion of the panel F is provided thereacross with an entrance slot 17 and extending outwardly from the panel F along the lower margin of the slot 17 is a landing platform 18.

The contact 12 is adjusted in accordance with temperature desired to have maintained within the brooder and which temperature is maintained automatically at a static level within the brooder both within and surrounding the hive or hives placed within the brooder. This is of advantage as such static temperature stimulates the queen as well as the brood and results in a faster development of the hive which would naturally be retarded when the temperature is too low.

Interposed in the conductor c is a conventional dial controlled rheostat 19 and supported within the housing is a reticulated sub-floor or bottom 20, preferably a wire mesh of desired guage. This sub-floor or bottom 20 is shown in the accompanying drawings as substantially flush with the top surface of the platform 18 and in a plane below the entrance slot 17.

From the foregoing description it is thought to be obvious that a bee brooder constructed in accordance with my invention is particularly well adapted for use by reason of the convenience and facility with which it may be assembled and operated.

I claim:

In a honey bee brooder, a rectangular housing having one of its sides open, a hinged closure for said open side, a flat electric heating element supported within and on the bottom of said housing, one of the other sides of said housing having an opening adjacent the top end thereof, a second housing mounted on the outer side of the said one side and enclosing said opening, a thermostat within said second housing immediately in front of said opening for controlling an electric current supply to said heating element, the side of the first housing opposite from said hinged closure having an entrance opening spaced above the plane of the top side of said heating element, a landing platform mounted on the outer side of the latter side of the first housing immediately below said entrance opening, and a false bottom of a wire mesh within the first housing spaced above the top side of said heating element and substantially in line with the bottom side of said entrance opening.

TWIGGS BENNETT.

REFERENCES CITED

The following references are of record in the file of this patent:

UNITED STATES PATENTS

| Number | Name | Date |
|---|---|---|
| 702,833 | Vogeler | June 17, 1902 |
| 1,889,184 | Siemers | Nov. 29, 1932 |
| 2,232,343 | Sauter | Feb. 18, 1941 |
| 2,434,090 | Alton | Jan. 6, 1948 |
| 2,506,118 | Taylor | May 2, 1950 |